US008437473B2

(12) United States Patent
Gantman et al.

(10) Patent No.: US 8,437,473 B2
(45) Date of Patent: May 7, 2013

(54) SMALL PUBLIC-KEY BASED DIGITAL SIGNATURES FOR AUTHENTICATION (75) Inventors: Alexander Gantman, Poway, CA (US); Gregory Gordon Rose, San Diego, CA (US); John W. Noerenberg, II, San Diego, CA (US); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 1296 days.

(21) Appl. No.: 11/817,146

(22) PCT Filed: Feb. 24, 2006

(86) PCT No.: PCT/US2006/006650
§ 371 (c)(1),
(2), (4) Date: Jul. 8, 2008

(87) PCT Pub. No.: WO2006/091844
PCT Pub. Date: Aug. 31, 2006

(65) Prior Publication Data
US 2009/0003597 A1 Jan. 1, 2009

Related U.S. Application Data

(60) Provisional application No. 60/656,796, filed on Feb. 25, 2005.

(51) Int. Cl.
*H04L 9/06* (2006.01)
(52) U.S. Cl.
USPC .............. 380/44; 380/30; 380/282; 713/156; 713/171; 713/176; 713/180
(58) Field of Classification Search ............. 380/30, 380/44, 282; 713/156, 171, 176, 180
See application file for complete search history.

(56) References Cited

U.S. PATENT DOCUMENTS

| 5,966,445 | A  | * | 10/1999 | Park et al. ................... 713/180 |
| 7,319,750 | B1 |   | 1/2008  | Maddury et al. |
| 2003/0059041 | A1 | * | 3/2003  | MacKenzie et al. ............ 380/28 |
| 2003/0081785 | A1 | * | 5/2003  | Boneh et al. .................. 380/277 |
| 2004/0205330 | A1 | * | 10/2004 | Godfrey et al. ............... 713/150 |
| 2005/0081038 | A1 | * | 4/2005  | Arditti Modiano et al. .. 713/176 |

(Continued)

OTHER PUBLICATIONS

Mihir Bellare Ran Canettiy Hugo Krawczykz, A Modular Approach to the Design and Analysis of Authentication and Key Exchange Protocols, Mar. 13, 1998, ACM, University of California at San Diego.*

(Continued)

*Primary Examiner* — Andrew L Nalven
*Assistant Examiner* — Amir Mehrmanesh
(74) *Attorney, Agent, or Firm* — Won Tae Kim (57) ABSTRACT

Embodiments disclosed allow authentication between two entities having agreed on the use of a common modulus N. The authentication includes generating a pseudorandom string value; generating a public key value based on the modulus N and the pseudorandom string value; generating a private key value corresponding to the public key value; receiving a verifier's public key value; generating a shared secret value based on the modulus N, the private key value and the verifier's public key value; calculating an authentication signature value using the shared secret value; and transmitting the authentication signature value for authentication. When the authentication signature is received, the public key value and the shared value are generated to calculate an authentication signature value. Thereafter, the authentication signature values are compared and authenticated.

20 Claims, 5 Drawing Sheets

U.S. PATENT DOCUMENTS

| | | | |
|---|---|---|---|
| 2005/0213769 A1* | 9/2005 | Girault et al. | 380/282 |
| 2005/0220300 A1* | 10/2005 | Lipson | 380/30 |
| 2006/0215837 A1* | 9/2006 | Chen et al. | 380/44 |

OTHER PUBLICATIONS

A. J. Menezese, P.C. Van Oorschtot, S. A. Vanston: "Handbook of Applied Cryptography" 1997, CRC Press, XP002387284; p. 308-311.

Shepherd S J et al.: "An Efficient Key Exchange Protocol For Cryptographically Secure CDMA Systems" Personal, Indoor and Mobile Radio Communications, 1997. Waves of the Year 2000. PIMRC '97., The 8th IEEE International Symposium on Helsinki, Finland Sep. 1-4, 1997, New York, NY, USA, IEEE, US, vol. 2, Sep. 1, 1997, pp. 480-484, XP010247693.

Chunming Tang, Zhuojun Liu, Jinwang Liu: "The Statistical Zero-Knowledge Proof for Blum Integer Based on Discrete Logarithm" IIACR, Nov. 7, 2003, pp. 1-19, XP002387272. Retrieved from Internet: URL:http://eprint.lacr.org/2003/232.pdf, retrieved on Jun. 26, 2006, Paragraph [0001]-[0002].

Blum M et al.: "An Efficient Probabilistic Public-Key Encryption Scheme Which Hides All Partial Information" Crypto. A Workshop on the Theory and Application of Cryptographic Techniques, Aug. 19, 1984, pp. 289-299, XP000775759.

International Search Report and Written Opinion—PCT/US2006/006650—ISA/EPO—Jul 12, 2006.

\* cited by examiner

```
GENERATING A PSEUDORANDOM STRING VALUE
FROM AN INPUT VALUE                              ~ 310
              ↓
GENERATING A PUBLIC KEY VALUE BASED ON
THE MODULUS N AND THE PSEUDORANDOM               ~ 320
STRING VALUE
              ↓
GENERATING A PRIVATE KEY VALUE
CORRESPONDING TO THE PUBLIC KEY VALUE            ~ 330
              ↓
GENERATING A SHARED SECRET VALUE BASED ON
THE MODULUS N, THE PRIVATE KEY VALUE AND         ~ 340
THE VERIFIER'S PUBLIC KEY VALUE
              ↓
CALCULATING AN AUTHENTICATION SIGNATURE
VALUE USING THE SHARED SECRET VALUE              ~ 350
```

RECEIVING A PUBLIC KEY VALUE GENERATED BASED ON THE MODULUS N — 510

GENERATING A PRIVATE KEY CORRESPONDING TO THE PUBLIC KEY VALUE BY SOLVING THE DISCRETE LOGARITHM PROBLEM MODULUO N — 520

USING THE PRIVATE KEY AS A SHARED SECRET KEY — 530

SMALL PUBLIC-KEY BASED DIGITAL SIGNATURES FOR AUTHENTICATION

BACKGROUND

1. Field

The invention generally relates to cryptography and more particularly to authentication.

2. Description of the Related Art

Authentication involves some form of digital signature or message authentication code. Digital signatures and message authentication codes are based on public-key and/or symmetric-key cryptographic systems. The two systems have different characteristics, making one more applicable in one situation while the other more applicable in a different situation.

Generally, public-key systems have advantages in terms of key management and distribution. However, public key systems may often be computationally difficult and may involve large digital signatures. Accordingly, public key systems may require a powerful processor which may cause an increase in the cost, weight and/or size of a device; may require additional processing time which may cause delays, use more energy and/or drain batteries; or may cause a combination of the above results.

As a result, most small authentication devices have been forced, by both computational requirements and the need for small outputs, to use symmetric-key cryptography. However, with more and more capable processors in devices such as mobile phones, the computational requirements may no longer be a dominating factor. Nevertheless, there is still a need for a smaller digital signature.

SUMMARY

In one aspect, a method and apparatus with means for use in authentication between two entities having agreed on the use of a common modulus N, comprises generating a pseudorandom string value from an input value; generating a first public key value based on the modulus N and the pseudorandom string value; generating a first private key value corresponding to the first public key value; receiving a second public key value; and generating a shared secret value based on the modulus N, the first private key value and the second public key value. Thereafter, an authentication signature value may be calculated using the shared secret value; and transmitted.

In another aspect, an apparatus for use in authentication between two entities having agreed on the use of a common modulus N, the apparatus may comprise a pseudo-random generator configured to generate a pseudorandom string value from an input value; a key generating unit configured to generate a first public key value based on the modulus N and the pseudorandom string value, and to generate a first private key value corresponding to the first public key value; a receiver unit configured to receive a second public key value; and a secret value generating unit configured to generate a shared secret value based on the modulus N, the first private key value and the second public key value.

In a further aspect, a method and apparatus with means for use in authentication between two entities having agreed on the use of a common modulus N, comprises receiving a first authentication signature value; generating a pseudorandom string value from an input value; generating a first public key value based on the modulus N and the pseudorandom string value; generating a shared secret value based on the modulus N, a private key value and the first public key value; calculating a second authentication signature value using the shared secret value; and comparing the first authentication signature value with the second authentication signature value.

In still another aspect, an apparatus for use in authentication between two entities having agreed on the use of a common modulus N, may comprise: a receiver unit configured to receive a first authentication signature value; a pseudo-random generator configured to generate a pseudorandom string value from an input value; a key generating unit configured to generate a first public key value based on the modulus N and the pseudorandom string value; a shared secret value generating unit configured to generate a shared secret value based on the modulus N, a private key value and the first public key value; a message authentication code unit configured to calculate a second authentication signature value using the shared secret value; and a comparing unit configured to compare the first authentication signature value with the second authentication signature value.

In a further aspect, a method and apparatus with means for use in authentication between two entities having agreed on the use of a common modulus N, comprises receiving a public key value generated based on the modulus N; generating a private key corresponding to the public key value by solving the discrete logarithm problem modulo N; and using the private key as a shared secret key.

The above methods may be carried out and/or controlled by a processor. Similarly, the above methods may be carried out and/or performed by instructions stored in a machine readable medium.

BRIEF DESCRIPTION OF THE DRAWINGS

Various embodiments will be described in detail with reference to the following drawings in which like reference numerals refer to like elements, wherein.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine readable medium such as various storage medium. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Generally, the description below allows a digital signature to be relatively small, for example, in the order of 6 digits. This allows the signature to be conveniently, easily, inexpensively and/or effectively used in various situations such as where the signature is transmitted over a low-bandwidth channel or the signature needs to be typed by a human, typically for authentication purposes. In the latter cases, a small digital signature would also be user-friendly.

In the following, come concepts related to the invention will be discussed for the purposes of explanation and/or for better understanding of the invention. Reference to specific situations, theorems, and/or formulas are examples and should not be construed to limit the scope of the invention.

Public-Key Signatures

Generally, there are two main classes of public-key digital signature algorithms in use today.

The most common one may be the RSA system, in which the public key is a large composite number N, and the underlying mathematical "hard problem" is the difficulty of factoring N into p*q. Current factoring algorithms are subexponential in complexity. Therefore, for security equivalent to breaking a symmetric algorithm with a key of, for example, 80 bits, the modulus N needs to be about 1024 bits. A digital signature in the RSA system is an integer approximately the same size as N. Verification of a digital signature requires performing an exponentiation modulo N to a (typically small) power e, and is relatively efficient.

The other common digital signature scheme is called El Gamal, Schnorr, or the Digital Signature (Standard) Algorithm DSA, depending on its exact realization. These schemes are based on the difficulty of calculating discrete logarithms modulo a prime number P. The Diffie-Hellman (D-H) key agreement algorithm was the first public-key system invented, and relies on the discrete logarithm problem. El Gamal is an application of the D-H to digital signatures. Schnorr and DSA use a trick to reduce the size of digital signatures. The modulus P is also typically 1024 bits.

While there may be no proof that the problems of factoring and discrete logarithms are linked, algorithms to solve either problem typically have an analog applicable to the other, which is why similar key sizes yield comparably secure systems. An El Gamal digital signature is a pair of numbers (r, s), each of size comparable to P, while Schnorr's method enables smaller signatures, where r and s are each 160 bits (for equivalent to 80 bit security).

Elliptic curve digital signatures are also a variation of El Gamal, using smaller keys and a different computation, but the resulting signature is still approximately 320 bits for minimum security.

The shortest practical digital signature using any of the above techniques may then be 320 bits. Expressed in decimal, this is a 90-digit number, or about 55 characters using the usual encoding of upper and lower case letters, digits, and a couple of punctuation characters. As such it would be very inconvenient and difficult for a user, for example, to reliably type the digital signature.

Mathematical Background

In the discussion below, an underlying problem of calculating discrete logarithms will be described. The problem is essentially Diffie-Hellman, but modulo a composite number N whose factorization is not publicly known, similar to the RSA system.

For example, the discrete logarithm problem can be stated as: given integers N, g, and X, where $X \equiv g^x \pmod{N}$, find x. In the traditional discrete log systems, N is usually a prime, and g is a generator of a large prime-order subgroup of the multiplicative group modulo N. For purposes of explanation, composite N is used. Solving the discrete logarithm problem mod N implies the ability to factor N, so long as $N \equiv 3 \pmod 4$, and N=pq, where p and q are prime; N is a so-called Blum Integer. Hereinafter, N refers to the product of primes p and q.

The Chinese Remainder Theorem (CRT) is also a useful technique. In a simple case, any integer X mod N can be expressed as a pair of integers (a, b), where $a \equiv X \pmod p$, and $b \equiv X \pmod q$. It is straightforward to convert between the two representations. It is often convenient to perform operations such as multiplication and exponentiation using the latter representation before converting back to the desired answer modulo N. It is expressed in terms of two factors, but it generalizes to multiple factors. The Unique Factorization Theorem states that every integer has a unique expression as a product of prime powers. As a result, the CRT can generally be used with respect to the prime factors.

Moreover, an integer that has only small prime factors is called smooth. "Small" here is usually defined in terms of a smoothness bound B. Pollard's p−1 algorithm can be used to factor composite numbers if, for one of the prime factors p, p−1 is smooth. A variant of the same algorithm can be used to calculate discrete logarithms modulo a prime P if P−1 is smooth. The Pohlig-Hellman algorithm can calculate discrete logarithms modulo a composite N if it is possible to calculate discrete logarithms modulo all of the factors of N, essentially by using the CRT to construct it.

Moreover, the Diffie-Hellman key agreement protocol works as follows. Two parties or entities such as, for example, Alice and Bob, have agreed on the use of a common modulus N and a generator g of a large subgroup of the group of units modulo N. Normally D-H operates with a prime modulus, but a composite one is used herein. Typically, Alice and Bob choose their secret keys a and b respectively, then calculate $A = g^a \pmod N$ and $B = g^b \pmod N$, respectively, and exchange A and B. Alice can then calculate a shared secret $S = B^a \pmod N = g^{ab} \pmod N$ and Bob can also the shared secret $S = A^b \pmod N = g^{ab} \pmod N$. Eavesdroppers typically cannot calculate S without solving the discrete logarithm problem modulo N.

Furthermore, a few kinds of cryptographic primitive will be described below. One is a Message Authentication Code (MAC), where a secret symmetric key is used to create a tag on a message. An entity with the same secret key can verify that the tag is correct, implying that the tag was created by someone knowing the key and that the message has not been altered. Also a Pseudo-Random Generator (PRG) can take a relatively small input and "stretches" it to a random-looking output of any desired size.

Both of these primitives can be constructed in well-known ways from hash functions, stream ciphers, or block ciphers. A hash function (HASH) such as SHA-256, for example, may be used to derive a key by hashing the shared secret derived from the Diffie-Hellman key agreement. Finally, for key generation, a cryptographically secure random number generator may be used for creating keys.

System Overview

There are generally two parts to a digital signature using a system based on discrete logarithms; one is a temporary public key, and the other is a MAC of the document being signed using a symmetric key derived from the Diffie-Hellman shared secret S. The temporary public key is often large, because the signer, for example Alice, creates it from a randomly chosen secret key, and typically has little or no control in creating the key.

In the embodiments described below, the temporary public key is created by using the PRG to stretch a small word or number of characters into something that can be used as the public key. The small word may be, for example, a number sequence, a selected number, a random number, a time, an alphabetic or alphanumerical word, symbol characters, or a combination thereof. Then, using the special construction of the modulus N and knowing its factors, Alice can effectively "break" her own public key to find the corresponding secret key. An attacker, not knowing the factorization, cannot do that. The MAC function is used with the data to be signed and the derived key, truncated to whatever size is useful in the context, to authenticate the data. Here, the key used to generate the output MAC may also be used subsequently as a session key for arbitrary communication, if appropriate.

It should be noted that short signatures may be inherently vulnerable to offline computation. Accordingly, these signatures can be targeted towards a specific verifier. They may be more useful for on-the-spot authentication (login, ATM transactions, etc.) or validating short, time-sensitive messages. The verifier may take additional measures to prevent brute force attacks, such as using two-factor authentication and disabling accounts when too many failures are detected.

Accordingly, some sort of device may be used to store the secret key and perform the necessary computations. This forms one of the factors for authentication. For two factor authentication, various second factor may be implemented such as, but not limited to, a password, personal identification number (PIN) or biometric. For example, a PIN might be entered into a verifying device, may be used to unlock the signing device, and/or may be incorporated into the signature calculation itself.

Therefore, Alice's secret key may be held in some device she may carry with her, such as, for example, her cell phone. Generally spealdng, it is generated inside the device from random numbers, and never leaves it, except perhaps in the form of "secret shares" that can be used to reconstruct it, a kind of backup, when she gets a new phone.

In the following discussion, a signature of "6 digit number" is used for purposes of explanation. However, it should be apparent to those skilled in the art that other words of more or less than 6 digits, hex digits, encoded alphanumerics, or whatever is suited to the input device, may be implemented. This could be different for different verifiers. A six (decimal) digit number has approximately $2^{20}$ possibilities, while a word of eight alphanumerical characters has $2^{40}$ possibilities, which is sufficient to protect against brute-force attacks. Some usages may be as follows. Again, it should be noted that the usages are examples, and it would be apparent to those skilled in the art that other usages and/or variations within the usages described below can be implemented.

Intranet Login To log on to her corporate intranet, Alice uses a device, such as her phone, to input "BigCom", and it displays a 6-digit number. Alice may then type her user name, and in the password field, her password and the authentication number. In this case, the digital signature may be based on a sequence number that is incremented every time such a number is requested. The intranet authentication server verifies both the password and the number, and uses the sequence number to prevent replay attacks.

Authentication by Telephone: Suppose Alice wishes to authenticate herself over the phone to a third entity such as, for example, her stockbroker. Alice's password could be entered into her phone. The password would then be incorporated into the signature calculation. The resulting number would be typed as the password. This method may be advantageous when, for example, the signature is to be read out over the phone or transmitted as DTMF tones. It may also be desirable that the password need not be revealed to the stockbroker personnel or any eavesdroppers.

Physical Access: To enter a structure, such as, for example, the office building, Alice may select "office" on her phone application, and type her employee number and the signature number. This may be automated by transmitting it using sound, DTMF tones, Infrared, Bluetooth, or RFID.

Home Entry: When Alice returns home, she may open her door by inputting her PIN into the phone, which has the effect of unlocking the authentication application. This means that the door controller doesn't need to have a password configured for her key, but nevertheless stealing Alice's phone won't be enough to get in. She then enters the resulting number to a standalone device that controls the door. This device was previously configured to recognize a number of different public keys, for Alice and her family members, and it uses the signature number to determine which of the possible keys (and hence which family member) to grant entry to. (Again, automated methods of transmission might be preferable.)

System Implementation

Generally there may be a number of phases to the authentication process. Assuming, for purposes of explanation, that Alice is the signing entity and Victor is the verifying entity, the authentication process may be is as follows.

1. Alice creates her public key. Alice may do this once, as she can use her public key with as many different verifiers as she wants. However, it would apparent to the skilled in the art that more than two or multiple public keys can be created for different verifiers or sets of verifiers.

2. Victor receives and stores Alice's public key, associates it with the appropriate object to secure, such as for example, accounts, locks and vehicles. Note that there may be multiple verifiers, who do not have to trust each other.

3. Victor creates his own private-public key pair, for use with Alice, and communicates this to Alice. Alice stores it for her interactions with Victor. Note that this key pair must be calculated modulo Alice's N and can't be used with a different signer.

4. Alice and Victor synchronize an input value. While the input value may be a random number or an alphanumeric value, using a number sequence would be effective way to do this. If a number sequence is used, the input to the signature process need not be communicated. Otherwise, an input value such as a short random number may be used as part of the signature.

5. Whenever Alice wants to authenticate herself to Victor, she can effectively generate a short authenticator based on the current value of the input value, and type it in, read it over the phone, transmit it audibly using DTMF tones, or communicate it using other various means as needed.

In the above process, the first step may happen once. Since the result is a public key, it could for example be submitted to a Certificate Authority to ease subsequent validation by verifiers, made available in public directories, and so on. Steps 2-4 are specific to each verifier, and steps 2 and 3 may need to be performed online, as both Alice's and Victor's public keys may be large. Note that Alice, who knows the factorization of the modulus N, can "break" Victor's public key to recover his secret key, but this secret key is specific to Alice. Accordingly, Alice would have no particular incentive to do so.

Figure 1:
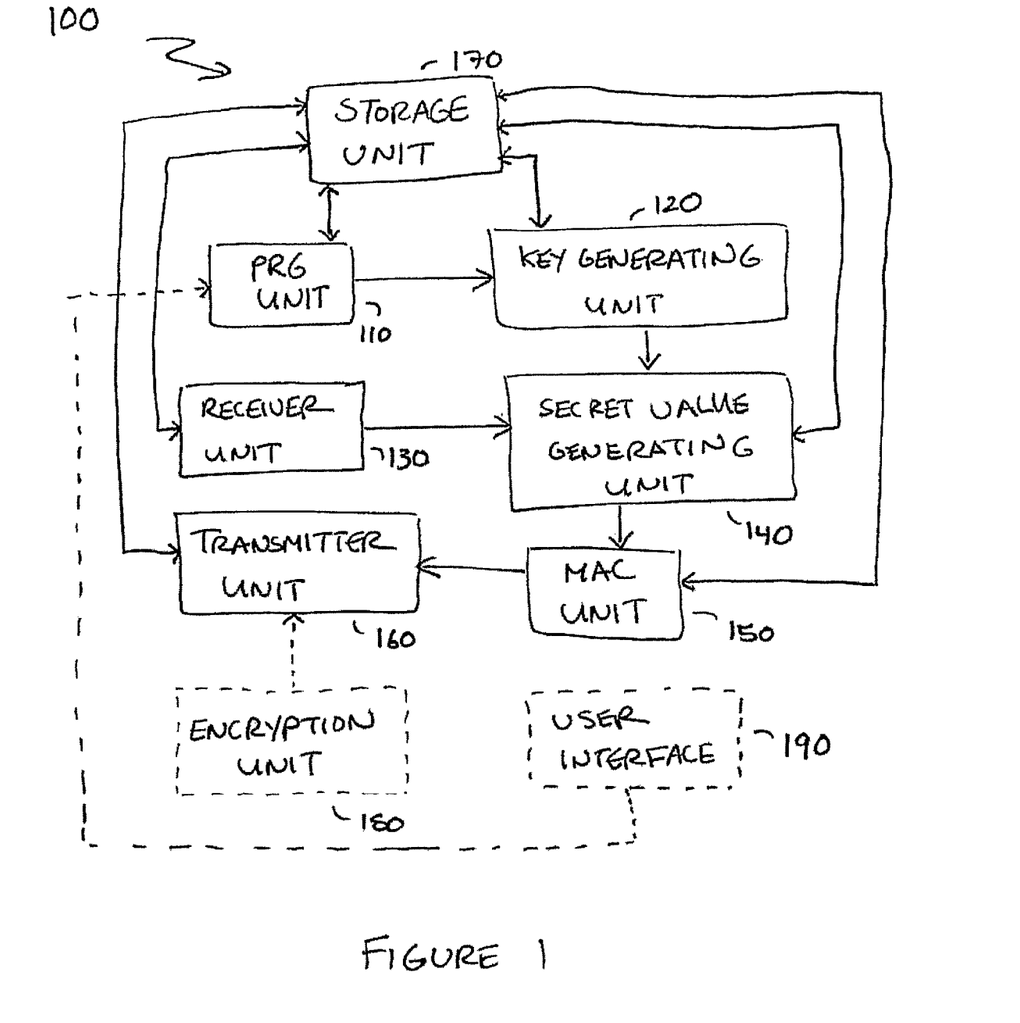
FIG. 1 shows an example device for use by an entity to generate a digital signature.

FIG. 1 illustrates an example device 100 that may be used, by Alice for example, to generate a digital signature. Device 100 may comprise a pseudorandom generating (PRG) unit 110 configured to generate a pseudorandom string value from an input value. Device 100 may also include a key generating unit 120 configured to generate a value based on the modulus N and the pseudorandom string value, such value is to be used as the public key. Key generating unit 120 is further configured to generate the private key value corresponding to the generated public key. Additionally, device 100 may comprise a receiver 130 configured to receive a public key value of the verifying entity; a secret value generating unit 140 configured to generate a shared secret value based on the modulus N, the private key value and the verifier's public key value; a MAC unit 150 configured to calculate an authentication signature value using the shared secret value; and a transmitter unit 160 configured to transmit the authentication signature value or digital signature.

Figure 2:
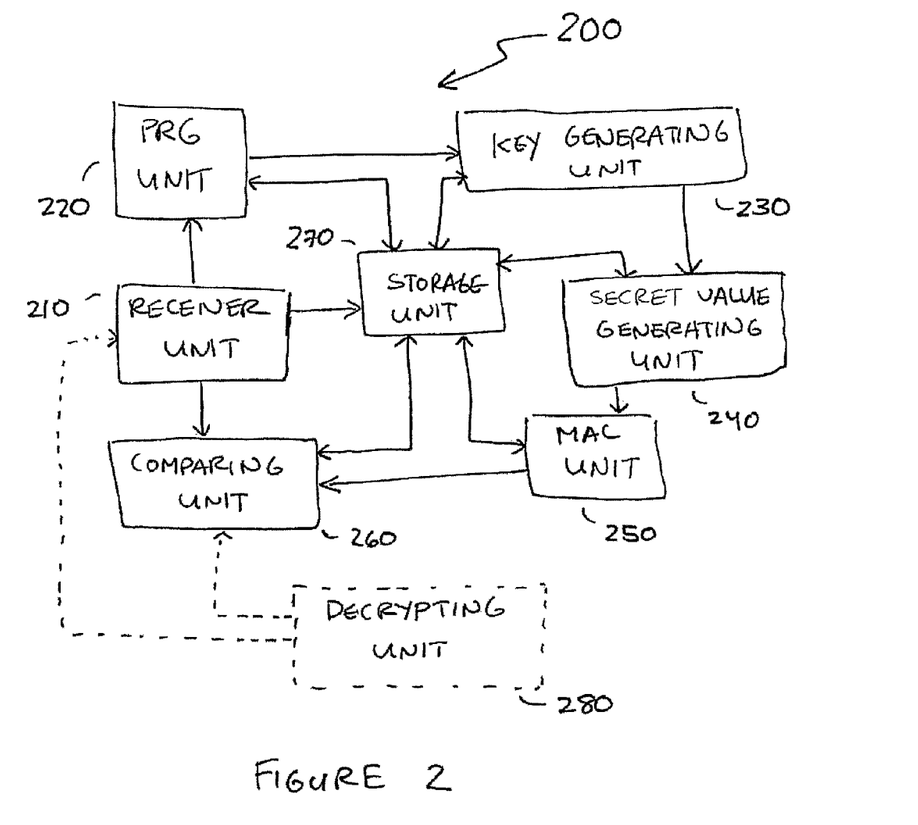
FIG. 2 shows an example device for use by a verifying entity to authenticate a digital signature.

FIG. 2 illustrates an example device 200 that corresponds to device 100 and may be used, by Victor for example, for authenticating a received digital signature. Device 200 may comprise a receiver unit 210 configured to receive an authentication signature value; a PRG unit 220 configured to generate a pseudorandom string value from an input value; a key generating unit 230 configured to generate the public key value based on the modulus N and the pseudorandom string value; a secret value generating unit 240 configured to generate a shared secret value based on the modulus N, a private key value and the public key value; a MAC unit 250 configured to calculate an authentication signature value using the shared secret value; and a comparing unit 260 configured to compare the received authentication signature value with the calculated authentication signature value. If the authentication signatures match, the received authentication signature can be authenticated.

Generally, the digital signature of one entity would be authenticated by another entity, wherein the two entities have agreed on the use of a common modulus N as will be described below. It should be noted that device 100 may comprise additional elements such as, but not limited to, a storage unit 170 configured to store various information or data as needed, an encryption unit 180 configured to perform encryption as needed and a user interface 190 configured to allow user to interact with device 100. Similarly, device 200 may comprise additional elements such as, but not limited to, a storage unit 270 configured to store various information or data as needed and a decrypting unit 280 configured to perform decryption as needed.

It should also be noted that one or a combination of the elements 110-190 may be rearranged without affecting the operation of device 100. Similarly, one or a combination of the elements 210-280 may be rearrangement without affecting the operation of device 200. Finally, one or a combination of the elements 110-190 may be implemented as combined without affecting the operation of device 100 and one or a combination of the elements 210-280 may be implemented as combined without affecting the operation of device 200. The operation of devices 100 and 200 will be described more in detail below.

In the description below, assume for purposes of explanation that the modulus N is 1024 bits. However, it should be apparent that the size may be less or greater than 1024 bits. The actual size is not fundamental, and increasing the size would yield more cryptographic security, but at the cost of more computational overhead. Moreover, references to other specific values, theorems and/or algorithms are examples for the purposes of explanation. Accordingly, it would be apparent to those skilled in the art that different values, theorems and/or algorithms can also be implemented.

Step 1: Creating Alice's Public Key

The public key in this system may comprise the composite modulus N, and a generator g of the group of units (that is, elements that have multiplicative inverses modulo N). Generally, 2, for example, may be a satisfactory generator at least half the time, so it might be worth generating possible Ns until this is true, and ignoring the possibility of a variable g.

N is generated at random so that it meets the following criteria:

1. N is the product of primes p and q. $N \equiv 3 \mod 4$ (i.e. a Blum Integer).
2. Either: 2 is a generator of the group of units modulo N, or find a small g that is such a generator.
3. $(p-1)/2$ is the product of large primes p1 and p2. Similarly, $(q-1)/2$ is the product of large primes q1 and q2.
4. p1, p2, q1, and q2, are each smooth, that is, (p1−1) and respectively (p2−1), (q1−1), (q2−1) being products of distinct primes less than, say, 1,000,000.

The process to create N would actually proceed from the bottom up. There are about 50,000 primes less than 1,000,000, and about 12 of them are needed for each of the four third stage factors (about 50 in total). There are about $2.8 \times 10^{170}$ such combinations, so there is no lack of candidates; the process may be lengthy, but it is done once. The number of possible Ns, while it's a relatively tiny fraction of the approximately $10^{305}$ 1024-bit primes, is nevertheless more than satisfactory to prevent any kind of search based on its special characteristics.

The table of the 50,000 or so base primes could be provided with the application and discarded after key generation, or could be created dynamically using the Sieve of Eratosthenes. Checking primality of the candidate larger primes would probably use a well known algorithm like trial division followed by multiple rounds of a probabilistic primality checking algorithm like Miller-Rabin.

Alice's secret key is all of the various primes mentioned above, and how they hang together to form N. Additional data that facilitates the various Chinese Remainder Theorem calculations might also be stored.

Step 2: Getting the Public Key Out

Alice's public key is based on modulus N (and g, if it isn't the constant 2). This can be transmitted either directly to Victor at the time Alice proves her identity to him, or it could be transmitted to a certificate authority who could create a certificate including her public key, and distribute that as needed. Being a public key, it really doesn't matter how it gets to Victor, so long as he is convinced of its connection to Alice.

Being public-key based, the same underlying key can be used for authentication in many different situations, and the manner in which the key gets distributed can be very flexible, including using public key infrastructure (PKI) certificates, LDAP/Active Directory, and so on.

Step 3: Victor's Public Key Pair

Victor may create his key pair to be used with Alice in the normal manner for a Diffie-Hellman key agreement, that is, he chooses a random v and calculates $V=g^v$ (mod N). V is the public key, which needs to be sent to Alice (and is not sensitive information, so long as Alice is convinced of its connection to Victor). Victor's secret key v should be unique to Alice, that is, he should use different vs for different subscribers. He stores v in his authentication/authorization database, along with any password/biometric information associated with Alice.

Step 4: Synchronizing a Sequence Number

When generating authentication signatures, some input item or input value that can be used by both Alice and Victor is needed. For a short signature, this input can either be implicitly synchronized like a number sequence, or it can be a small random number, or be related to the current time, or can even be the data the signature will apply to. Protection from replay attack is also important, and a number sequence may provide this protection in a simple manner. If the signature is to apply to transmitted data in some fashion, the data itself should somehow take care of replay attacks.

For purposes of explanation, assume that Alice and Victor use a number sequence. The number sequence may be initialized to zero and incremented each time an authentication number is generated/accepted. If Victor last saw a signature for number sequence i, he may check the signature assuming sequence number i+1, i+2, ..., up to some fairly small limit. When a signature is accepted, the sequence number gets updated to that value, to prevent replay attacks. A time-based system might accept signatures based on time values within a small range of the current time, for example.

Step 5: Generating/Checking an Authentication Signature.

Assume further for purposes of explanation that the input value or data item to be signed (whether it's a sequence number, a timestamp, or some kind of short message) is called A.

1. A is stretched. Calculate D=PRG(A) mod N. Recall that PRG generates a pseudorandom string of arbitrary length from its input. The PRG may generate as many bits as there are in the modulus. While more or less than that may be generated, it may not be as useful, and for security, it is desired to be approximately uniformly distributed over the integers modulo N). Bad values of D will be generated with negligible probability; these would be either very small values, or ones where GCD(D,N)≠1 (in which case N has been accidentally factored).

2. D will be used as Alice's public value in a Diffie-Hellman key agreement. For her to complete the process, she needs to know the corresponding secret value (d). To do this, she may solve the discrete logarithm problem modulo N. Alice can do that because she knows all the details of the factors of the various numbers.

a. Using the Chinese remainder theorem from the corresponding discrete logs modulo p and modulo q, the secret value d may be calculated.
 b. Using the Pohlig-Hellman algorithm, the discrete logarithm modulo p may be determined by calculating the discrete logarithms modulo p1 and p2. Similarly for q.
 c. Again using Pohlig-Hellman, the discrete logarithm modulo p1 may be determined by finding the discrete logarithms modulo all of the prime factors of p1−1.
 d. Calculating a discrete logarithm modulo f, where f is a prime<1,000,000, may be done by Pollard's Rho algorithm, index calculus, or even brute force, in manageable time. This has to be done for about 50 values off in this example.

3. Alice may calculate the shared secret S in the normal Diffie-Hellman fashion. S=HASH($V^d$(mod N)). It should be noted that if a sequence number is used, the steps to this point can all be calculated before the authentication signature is to be transmitted. In such cases, a device such as for example, a phone, may use the already calculated value of S, and after the next steps are completed, begin the relatively expensive calculation of the next S.

4. Alice may calculate the authentication signature or digital signature to be transmitted as a=MAC(S). Alternatively, the authentication signature may be generated using other values as inputs such as, but not limited to, a=MAC(S, input value), a=MAC(S, d[PIN]), a=MAC(S, input value, d[PIN]) or a=MAC(S, d[input value, PIN]), where the d[ ] refers to encryption of [ ] using d. The authentication signature may then be truncated appropriately and converted into the desired representation. If the PIN/password and/or input value is to be transmitted independently it may not be included in this computation.

5. Somehow, Alice transmits her message (which may be empty) and the authentication signature a. This could be simply by typing a 6 digit number on a numeric keypad.

6. Victor receives the authentication signature, and knows what A is (either because it's the current sequence number, or the current time, or the received message). He calculates D=PRG(A) in the same manner as Alice.

7. Victor calculates the shared secret S=HASH($D^v$(mod N).

8. Victor checks that the received a is the same as the one he calculates in the same manner as Alice.

9. Authentication can be considered successful if the signatures match, and if the PIN/password was independently transmitted, that it also matches. If the sequence number method was used, Victor updates the current sequence number to A+1.

It should be noted that Pollard's p−1 algorithm can factor N if one of its factors minus 1 is smooth. Both p and q were specifically chosen to avoid this probability. (Note that it's possible to use this method when p−1 and q−1 are both smooth; this requires special choice for all of the factors of p−1 and q−1 and eventually results in a method where Alice's work to break public keys is the square root of an attacker's work to factor N. By introducing another layer of large primes, significant advantage is gained.) There is no reason to believe that the structure of N allows any other factorization algorithm to succeed with better probability than it would for a random N.

Also note that at the end of a successful authentication, the shared secret S may be used as a session key or a shared secret key, although under the assumption of limited bandwidth, it may not be efficient. Alternatively, when Alice receives Victor's public key V, she can "break" it in the same manner as she does for her own temporary value to get v (Victor's secret key for use with Alice). Effectively, what has happened is that the public key method has been used for Victor to communicate his v to Alice.

The rest of what is discussed above could then be performed identically in Alice's device and Victor's device, even using the shared v as a session key or a shared secret key.

Figure 3:
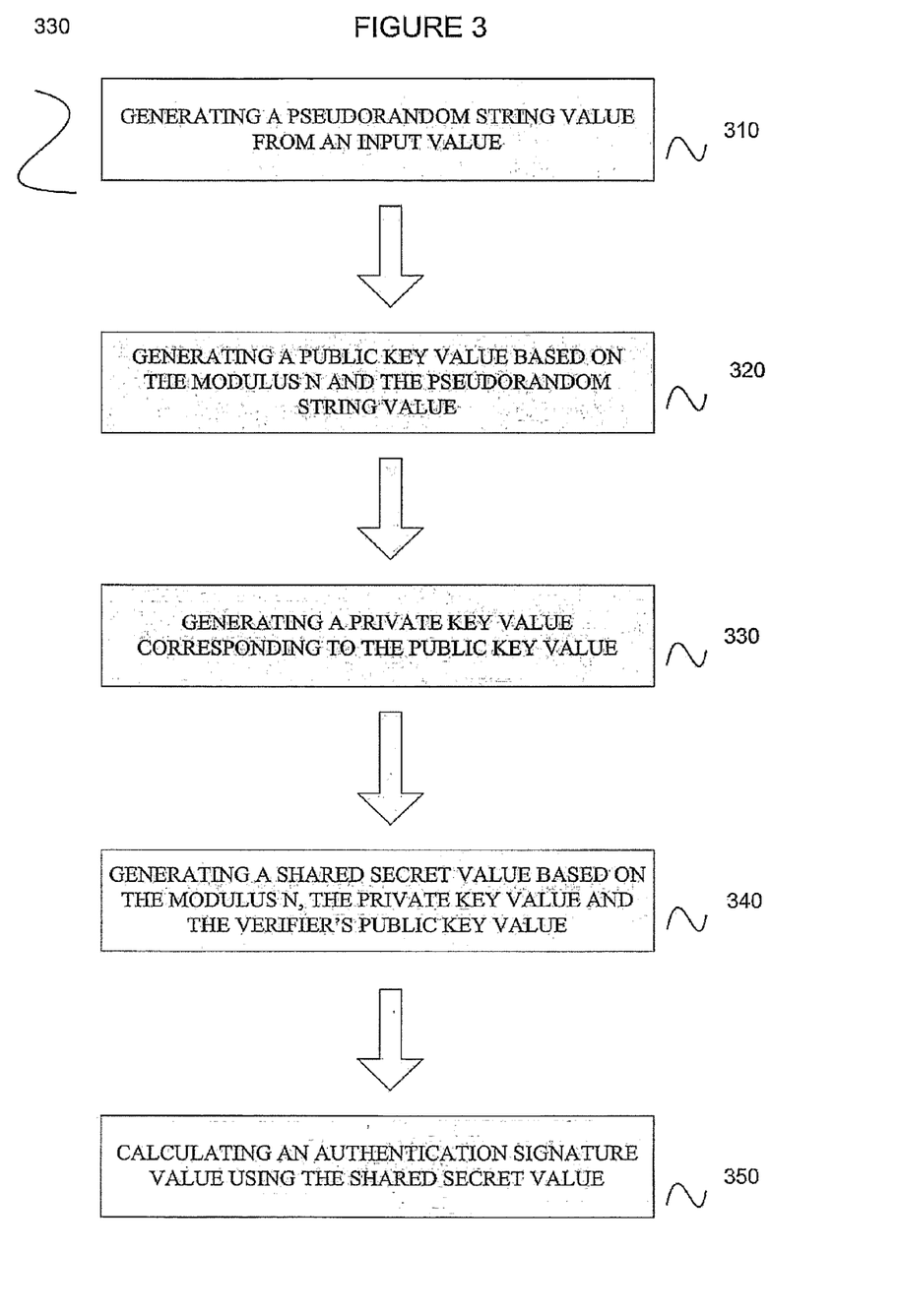
FIG. 3 shows an example method for use in generating a digital signature.

Accordingly, generation of a digital signature and authentication can be performed. FIG. 3 shows an example method 300 for use in authentication between two entities having agreed on the use of a common modulus N as above. In method 300, a pseudorandom string value is generated (310) from an input value. The input value may be as described above and be based on user input data. For example, the user input data may be, but is not limited to, a number sequence, a random number, a current time, an alphabetic word, an alphabetic phrase, an alphanumeric work or an alphanumeric phrase.

A public key value for the authenticating or signing entity is then generated (320) based on the modulus N and the pseudorandom string value as described above, namely by stretching or expanding the input value and then solving for the stretched input value modulus N. A private key value corresponding to the public key value is also generated (330). The private key value may be generated by solving for the discrete logarithm problem modulo N. For example, the private key value may be generated using the Chinese remainder theorem, the Pohlig-Hellman algorithm and the Pollard's Rho algorithm.

A shared secret value is then generated (340) based on the modulus N, the private key value and a verifier's public key value. Here, the verifier's public key may be received any time prior to the generation of the shared secret value. An authentication signature value or digital signature is calculated (350) using the shared secret value. Here, the authentication signature may be generated also using the input value or an encrypted input value. Alternatively, the authentication signature may be generated using the shared secret value and a PIN or password. Still alternatively, the authentication signature may be generated using the shared secret value, the input value and the PIN. In cases in which the PIN is used, the PIN may be received from the signing entity and encrypted to be used in the authentication signature. The input value, if needed, and the PIN may be encrypted using the private key or other agreed upon cryptographic key so long as the verifier can decrypt the encrypted key. Also, if used to generate the authentication signature value, the (encrypted) input value and/or encrypted PIN is transmitted to the verifier. Note that in some cases, the input value may be used in the authentication signature, but may not be transmitted, for example, if a number sequence is used.

Thereafter, the authentication signature value may be transmitted to the verifying entity. The authentication signature value may be truncated before transmission.

Various means may be implemented to achieve and/or perform method 300. If using the example device 100, PRG unit 110 may generate the pseudorandom string value, key generating unit 120 may generate the public key and the private key, secret value generating unit 140 may generate the secret value and MAC unit 150 may calculate the authentication signature. Storage unit 170 may store data and/or information related to the agreed upon common modulus as well as other data and/or information needed for the operation of device 100. Receiver unit 130 may receive the verifier's public key. Transmitter unit 160 may transmit the authentication signature and the input value as needed. Furthermore, encryption unit 180 may encrypt the input value and/or the PIN, and user interface 190 may be used to receive user input data and PIN. Moreover, the authentication signature may be truncated by MAC unit 150 after generation or by a separate element such as for example, a processor (not shown) or transmitter unit 160, before transmission.

Figure 4:
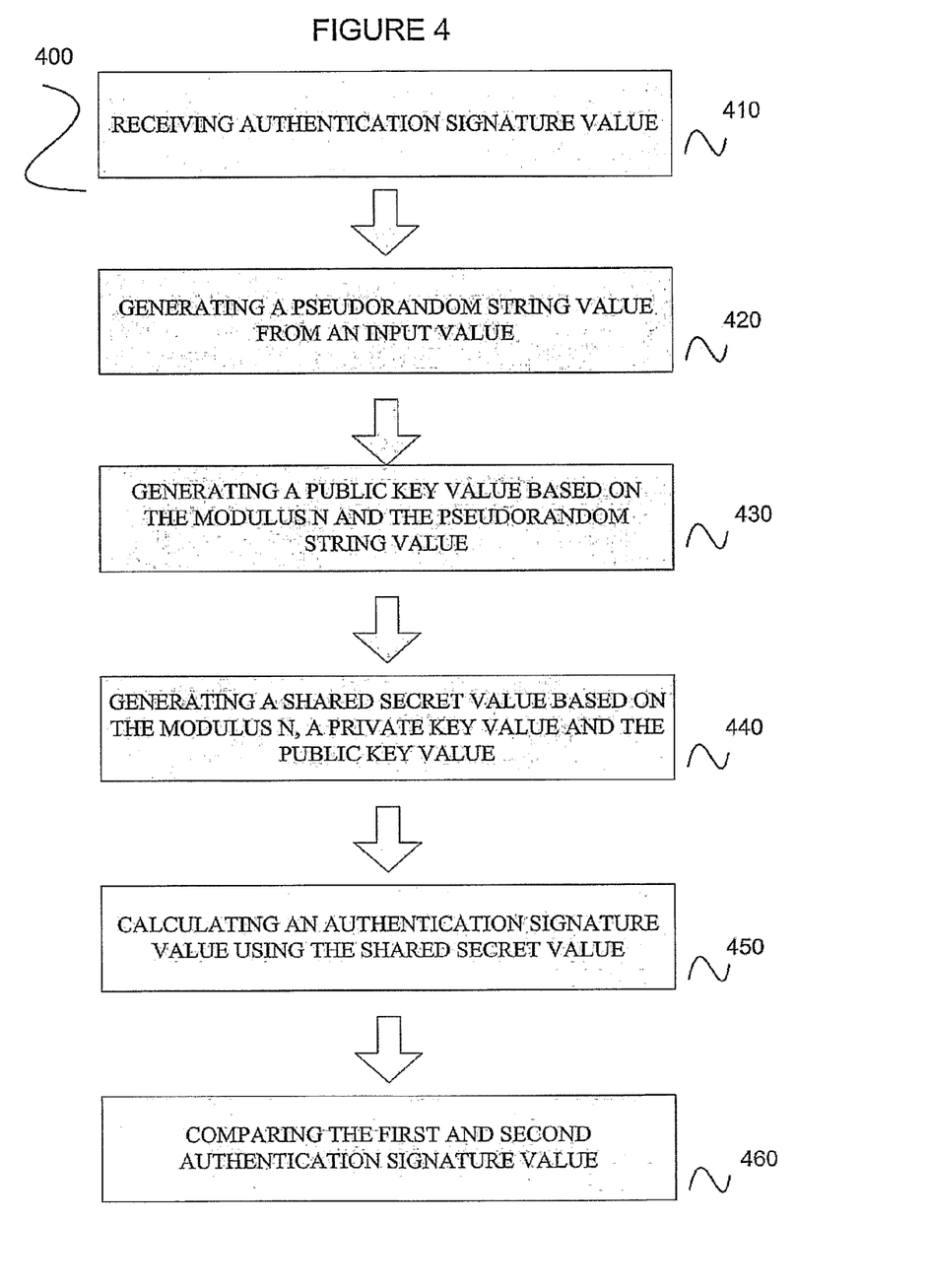
FIG. 4 shows an example method for use in authenticating a digital signature.

FIG. 4 shows an example method 400 corresponding to method 300 for use in authentication between two entities having agreed on the use of a common modulus N. In method 400, an authentication signature value is received (410) to be authenticated. To authenticate, a pseudorandom string value is generated (420) from an input value. Here, the pseudorandom string value may be generated in the same manner as in method 300.

A public key value is then generated (430) based on the modulus N and the pseudorandom string value in the same manner as method 300; and a shared secret value is generated (440) based on the modulus N, a private key value and the public key value in the same manner as method 300. Here, the private key would be the private key corresponding to the public key of the signing entity and can also be generated in the same manner as method 300. Namely, the private key can be generated by solving the discrete logarithm problem modulo N.

An authentication signature value is generated (450) using the shared secret value in the same manner as in method 300. Accordingly, the authentication signature may be generated also using the input value or an encrypted input value. Alternatively, the authentication signature may be generated using the shared secret value and a PIN or password. Still alternatively, the authentication signature may be generated using the shared secret value, the input value and the PIN. In cases in which the PIN is used, an encrypted PIN is received from the signing entity and is used in the authentication signature. In cases in which the input value is used, the input value may be received from the signing entity in some cases. However, in some cases, the input value need not be received, for example, if a number sequence is used.

The received authentication signature value is compared (460) with the calculated authentication signature value. As the received authentication may be a truncated portion of the authentication signature, the received authentication signature value may be compared with a truncated portion of the calculated authentication signature value. If the two signature values match, the received authentication signature can be authenticated. Here, the PIN may also be used in the authentication process. Namely, to provide a two-factor authentication, the PIN corresponding to the signing entity may be stored. Thus, if an encrypted PIN is received, the PIN may be decrypted and compared with the stored PIN. If both the authentication signature values and the PINs match, the authentication signature is authenticated. The input value, if needed, and the PIN may be decrypted using the private key of the signing entity or other agreed upon cryptographic key so long as the verifier can decrypt the encrypted key.

Various means may be implemented to achieve and/or perform method 400. If using the example device 200, receiver unit 210 may receive the authentication signature value and the input value and/or the encrypted PIN, as needed. PRG unit 220 may generate the pseudorandom string value, key generating unit 230 may generate the public key and the private key, secret value generating unit 240 may generate the shared secret value, MAC unit 250 may calculate the authentication signature and comparing unit 260 may compare the authentication signatures and the PIN as needed. Storage unit 270 may store data and/or information related to the agreed upon common modulus as well as other data and/or information needed for the operation of device 200. Decryption unit 280 may decrypt the input value and/or the PIN, as needed.

As such, a digital signature can be generated, transmitted and authenticated.

Figure 5:
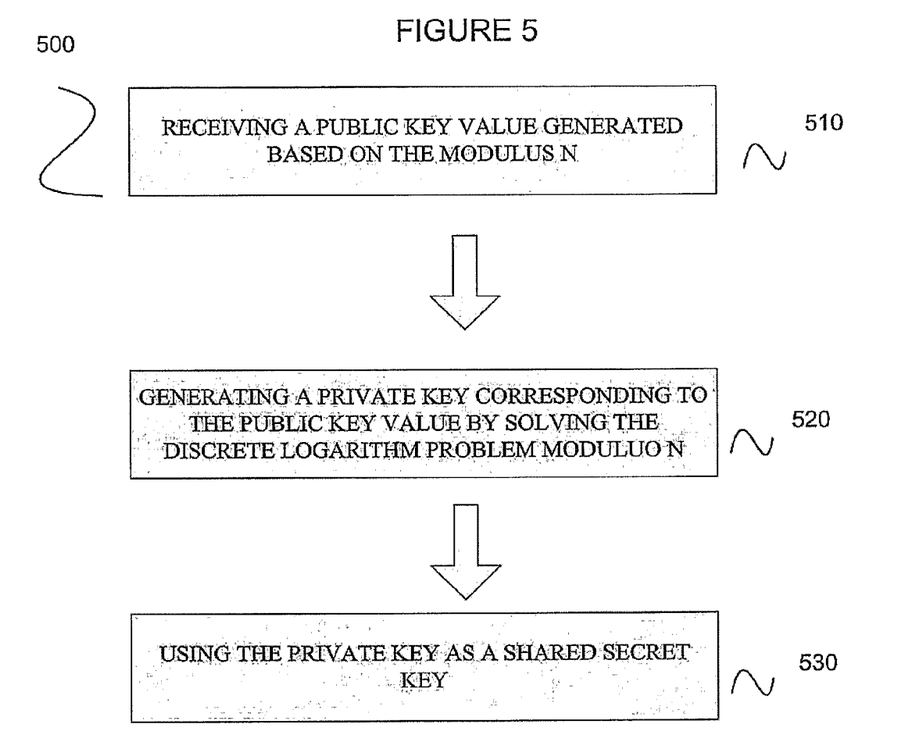
FIG. 5 shows another example method for use in authentication.
Figure 6:
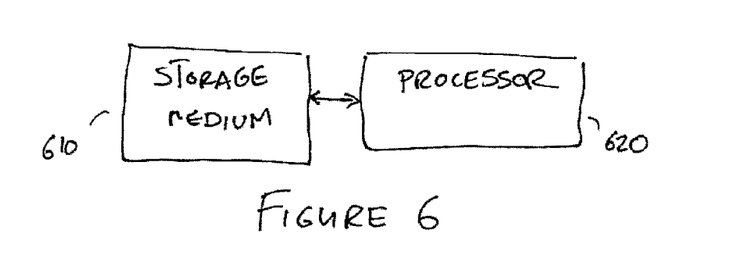
FIG. 6 shows another example device for use in authentication.

It should be noted that various other authentication can be achieved. For example, FIG. 5 shows an alternative method 500 in which a public key generated based on the modulus N of another entity is received (510). The private key corresponding to the received public key may be generated (520) also by solving the discrete logarithm problem modulo N. Thereafter, the private key corresponding to the verifier's public key may be used (530) as a shared secret key or symmetric key in future communications between two entities.

Furthermore, it should be noted that methods 300, 400 and 500 may be implemented by a storage medium 610 and a processor 620 as shown in FIG. 600. Storage medium 610 may comprise instructions configured to perform the methods 300, 400 and 500. Processor 620 may control the operation of the methods 300, 400 and 500 by, for example, executing the instructions stored in the storage medium.

In addition, since the digital signatures can be short, they are amenable to all sorts of space or bandwidth constrained situations, for example they can be read out over a telephone, entered into a keypad, or even handwritten on forms. Therefore, they may not entirely prevent forgery in a general situation. Nevertheless, there are ways in which such signatures can be used in general situations. For example, the signature may be implemented to be time-dependent and valid for a short time. The signature input can also be made relatively untappable (for example, inputting the signature to a keypad on a door that does local verification). The verifying entity may disable, or lock out for a time, if more than a couple of unsuccessful attempts to authenticate are made in quick succession. This is similar in principle to the way an ATM "eats" a card if a PIN is incorrectly entered three times in a row.

Alternatively, the signatures may be created for a specific verifying entity, that is, targeted to one particular verifier's own public key. Again, that verifier may "lock out" the account if too many unsuccessful authentication attempts are made. However, the signature need not necessarily be time-dependent, and the attempts might be spaced out in time. This is similar to current treatment of login passwords.

Finally, while the embodiments have been described with reference to entities Alice and Victor, it should be apparent the other types of entity may be applicable. Also, while the implementations have been described with reference to specific conditions and values, it should be apparent that different conditions and values can be applied without affecting the general authentication process.

Accordingly, the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for use in authentication between two entities having agreed on the use of a common modulus N, the method comprising:
   generating a pseudorandom string value from an input value;
   generating a first public key value based on the modulus N and the pseudorandom string value;
   generating a first private key value corresponding to the first public key value;
   receiving a second public key value;
   generating a shared secret value based on the modulus N, the first private key value and the second public key value;
   calculating an authentication signature value using the shared secret value; and
   transmitting the authentication signature value.

2. The method as in claim 1, further comprising:
   truncating the authentication signature value; and wherein transmitting the authentication signature value comprises transmitting a truncated authentication signature value.

3. The method as in claim 1, wherein calculating the authentication signature value comprises calculating the authentication signature value using the shared secret value and the input value.

4. The method as in claim 1, further comprising:
   receiving a password value;
   encrypting the password value using the first private key value; and
   transmitting the encrypted password value.

5. The method as in claim 4, wherein calculating the authentication signature value comprises calculating the authentication signature value using the shared secret value and the encrypted password value.

6. The method as in claim 1, wherein generating the first private key value comprises:
   generating the first private key value by solving for the discrete logarithm problem modulo N.

7. The method as in claim 1, further comprising:
   receiving a user input data and wherein the input value is based on the user input data.

8. The method as in claim 1, further comprising:
   transmitting the input value.

9. The method as in claim 1, further comprising:
   generating a second private key corresponding to the second public key value by solving the discrete logarithm problem modulo N; and
   using the second private key as a shared secret key.

10. A system comprising a non-transitory storage medium storing instructions and a processor communicatively coupled to the non-transitory storage medium and configured to control the performance of a method as in any one of the preceding claims by executing the instructions.

11. A non-transitory storage medium storing instructions to, when executed by a processor, perform a method as in claim 1 or any one of the claims 2-10 dependent thereon.

12. Apparatus for use in authentication between two entities having agreed on the use of a common modulus N, the apparatus comprising:
   means for generating a pseudorandom string value from an input value;
   means for generating a first public key value based on the modulus N and the pseudorandom string value;
   means for generating a first private key value corresponding to the first public key value;
   means for receiving a second public key value;
   means for generating a shared secret value based on the modulus N, the first private key value and the second public key value;
   means for calculating an authentication signature value using the shared secret value; and
   means for transmitting the authentication signature value.

13. The apparatus as in claim 12, further comprising:
   means for truncating the authentication signature value; and wherein transmitting the authentication signature value comprises transmitting a truncated authentication signature value.

14. The apparatus as in claim 12 or claim 13 as dependent thereon, wherein the means for calculating the authentication signature value comprises means for calculating the authentication signature value using the shared secret value and/or the input value.

15. The apparatus as in claim 12, further comprising:
means for receiving a password value;
means for encrypting the password value using the first private key value; and
means for transmitting the encrypted password value.

16. The apparatus as in claim 15, wherein the means for calculating the authentication signature value comprises means for calculating the authentication signature value using the shared secret value and the encrypted password value.

17. The apparatus as in claim 12, wherein the means for generating the first private key value comprises:
means for generating the first private key value by solving for the discrete logarithm problem modulo N.

18. The apparatus of claim 12, further comprising:
means for generating a second private key corresponding to the second public key value by solving the discrete logarithm problem modulo N; and
means for using the second private key as a shared secret key.

19. Apparatus for use in authentication between two entities having agreed on the use of a common modulus N, the apparatus comprising:
a storage unit storing instructions; and
a processor communicatively coupled to the storage unit and configured to execute the instructions to implement:
a pseudo-random generator configured to generate a pseudorandom string value from an input value;
a key generating unit configured to generate a first public key value based on the modulus N and the pseudorandom string value, and to generate a first private key value corresponding to the first public key value;
a receiver unit configured to receive a second public key value;
a secret value generating unit configured to generate a shared secret value based on the modulus N, the first private key value and the second public key value;
a message authentication code unit configured to calculate an authentication signature value using the shared secret value; and
a transmitter unit configured to transmit the authentication signature value.

20. The apparatus as in claim 19, wherein the transmitter unit transmits a truncated authentication signature.

* * * * *